United States Patent
Hoshika et al.

(10) Patent No.: US 12,348,105 B2
(45) Date of Patent: Jul. 1, 2025

(54) ROTATING ELECTRIC MACHINE

(71) Applicant: Nissan Motor Co., Ltd., Yokohama (JP)

(72) Inventors: Seiji Hoshika, Kanagawa (JP); Karim Mikati, Kanagawa (JP); Hiroyuki Shibui, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/832,781

(22) PCT Filed: Jan. 25, 2022

(86) PCT No.: PCT/JP2022/002711
§ 371 (c)(1),
(2) Date: Jul. 24, 2024

(87) PCT Pub. No.: WO2023/144893
PCT Pub. Date: Aug. 3, 2023

(65) Prior Publication Data
US 2025/0132629 A1    Apr. 24, 2025

(51) Int. Cl.
  *H02K 5/14* (2006.01)
  *B60K 1/00* (2006.01)
  *H01R 39/38* (2006.01)

(52) U.S. Cl.
  CPC .............. *H02K 5/141* (2013.01); *B60K 1/00* (2013.01); *H01R 39/385* (2013.01)

(58) Field of Classification Search
  CPC .......... H02K 5/141; H02K 5/14; H02K 5/143; H02K 5/145; H02K 5/146; H02K 5/148; B60K 1/00; H01R 39/385; H01R 39/38; H01R 39/386; H01R 39/388; H01R 39/39
  USPC .................................................. 310/232–253
  See application file for complete search history.

(56) References Cited

U.S. PATENT DOCUMENTS

| | | | |
|---|---|---|---|
| 2002/0063493 A1* | 5/2002 | Hosoya | H02K 3/51 310/236 |
| 2003/0155836 A1* | 8/2003 | Uda | H01R 39/48 310/239 |
| 2007/0046135 A1* | 3/2007 | Tsuge | H01R 39/46 310/239 |

(Continued)

FOREIGN PATENT DOCUMENTS

| | | |
|---|---|---|
| JP | H06-21377 U | 3/1994 |
| JP | 2871003 B2 | 3/1999 |

(Continued)

*Primary Examiner* — Ahmed Elnakib
(74) *Attorney, Agent, or Firm* — Young Basile Hanlon & MacFarlane, P.C.

(57) ABSTRACT

A rotating electric machine has a brush holder that holds brushes. A first cover through which a rotor shaft passes is provided on one end side in an axial direction. A brush holder accommodating portion that accommodates the brush holder is recessed in the first cover in the axial direction from an outer side of the first cover. The brush holder is disposed in the brush holder accommodating portion such that a distance between a lower surface of the brush holder and an inner peripheral wall of the brush holder accommodating portion is larger than a distance between another portion of the brush holder and another inner peripheral wall of the brush holder accommodating portion.

7 Claims, 4 Drawing Sheets

(56) References Cited

U.S. PATENT DOCUMENTS

| | | | |
|---|---|---|---|
| 2008/0061652 A1 | 3/2008 | Yamamuro et al. | |
| 2010/0244620 A1* | 9/2010 | Klumpp | H01R 39/045 |
| | | | 310/228 |
| 2014/0312731 A1* | 10/2014 | Oguri | H02K 13/00 |
| | | | 310/239 |
| 2025/0007359 A1* | 1/2025 | Huang | H02K 5/14 |

FOREIGN PATENT DOCUMENTS

| | | | | |
|---|---|---|---|---|
| JP | 2008-067568 A | 3/2008 | | |
| JP | 2014-226021 A | 12/2014 | | |
| JP | 2018-027239 A | 2/2018 | | |
| WO | WO-2015040823 A1 * | 3/2015 | | H02K 5/148 |
| WO | 2016/013450 A1 | 1/2016 | | |

* cited by examiner

ROTATING ELECTRIC MACHINE

TECHNICAL FIELD

The present invention relates to a rotating electric machine.

BACKGROUND ART

In a rotating electric machine including a brush for supplying electric power to a rotor, abrasion powder of the brush or the like is generated due to friction between the brush and a rotor shaft. When such abrasion powder is accumulated, an insulation property of the rotating electric machine is deteriorated.

JP 2871003 B discloses a rotating electric machine in which a concave portion is provided on a side surface of a brush, and the brush is abraded to the concave portion by a commutator, thereby abrading a fixed matter of the abrasion powder during rotation. Accordingly, it is possible to prevent a short circuit between commutators.

SUMMARY OF INVENTION

Problem to be Solved by the Invention

The technique described in the above patent document does not take into account an influence of abrasion powder accumulating in a housing or the like around the brush. Therefore, there is a concern that an insulation property between the brush and the housing is deteriorated.

In view of such a problem, an object of the present invention is to provide a rotating electric machine capable of preventing deterioration in an insulation property between a brush and a housing due to abrasion powder.

Means for Solving the Problem

According to an embodiment of the present invention, the present invention is applied to a rotating electric machine including a brush holder that holds brushes. A first cover through which a rotor shaft passes is provided on one end side in an axial direction. A brush holder accommodating portion that accommodates the brush holder is recessed in the first cover in the axial direction from an outer side of the first cover. The brush holder is disposed in the brush holder accommodating portion such that a distance between a lower surface of the brush holder and an inner peripheral wall of the brush holder accommodating portion is larger than a distance between another portion of the brush holder and another inner peripheral wall of the brush holder accommodating portion.

Effect of the Invention

According to the present invention, the brush holder is disposed such that the distance between the lower surface of the brush holder and the inner peripheral wall of the brush holder accommodating portion is larger than the distance between the other portion of the brush holder and the other inner peripheral wall of the brush holder accommodating portion, so that a space on a lower surface side of the brush holder can be increased. Accordingly, even if abrasion powder of the brush is accumulated in this space, an insulation distance between the brush and a housing can be maintained. In this way, it is possible to prevent deterioration in an insulation property between the brush and the housing.

DESCRIPTION OF EMBODIMENTS

Hereinafter, an embodiment of the present invention will be described with reference to the drawings or the like.

Figure 1:
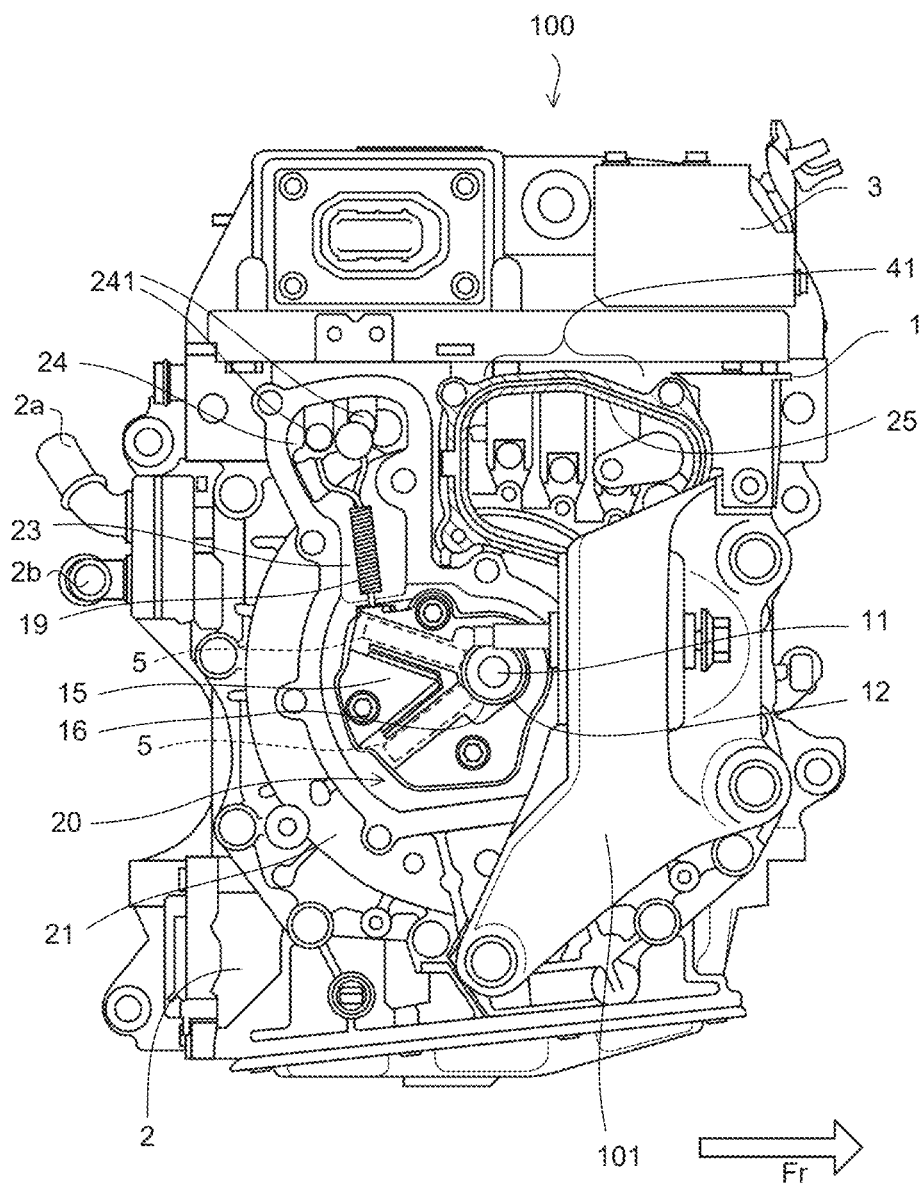
FIG. 1 is an explanatory diagram of a rotating electric machine according to an embodiment of the present invention.
Figure 2:
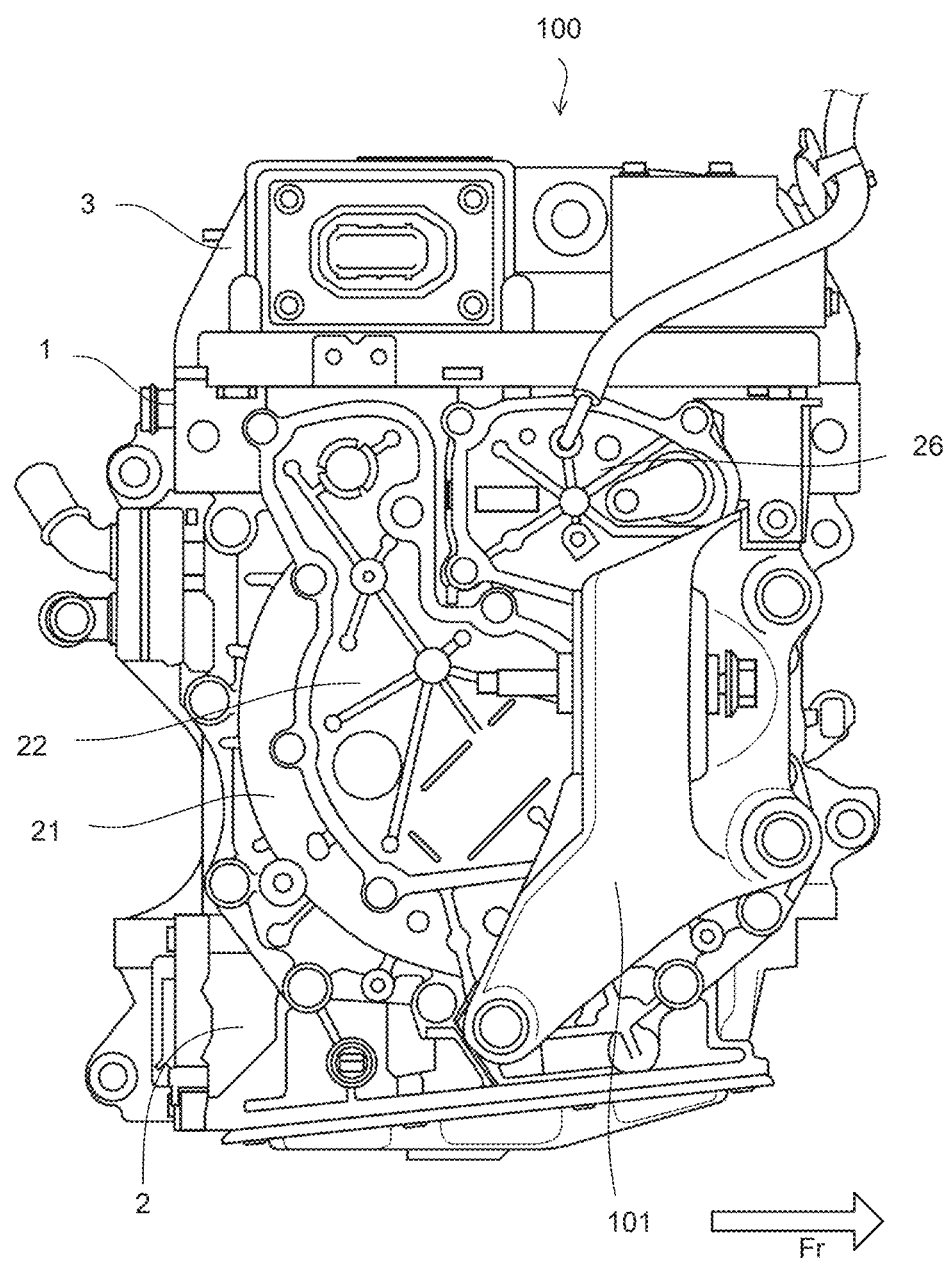
FIG. 2 is an explanatory diagram of the rotating electric machine.

FIG. 1 is an explanatory diagram when a drive unit 100 including a rotating electric machine 1 of the present embodiment is observed from a side in an axial direction. FIG. 2 is an explanatory diagram of the drive unit 100 and shows a state where a second cover 22 and a bus bar cover 26 are mounted.

The drive unit 100 includes the rotating electric machine 1 and an inverter unit 3 that supplies electric power to the rotating electric machine 1. The inverter unit 3 is mounted on an upper portion of the rotating electric machine 1.

The rotating electric machine 1 includes a housing 2 that accommodates a rotor and a stator (not shown). The rotor includes a rotor shaft 11. The housing 2 includes a refrigerant flow path through which a refrigerant (cooling oil) for cooling circulates, and a refrigerant inlet 2a and a refrigerant outlet 2b through which the refrigerant flows into and out of the housing 2.

The rotating electric machine 1 is mounted on a vehicle and functions as an electric motor that drives wheels. The rotating electric machine 1 also functions as an electric power generator that generates (regenerates) electric power by receiving a driving force generated by rotation of the wheels. The rotating electric machine 1 is implemented by a winding field type electric motor.

The housing 2 has an internal cavity shape having an opening, and the stator and the rotor are accommodated in the internal cavity. The opening that is open on the side of the axial direction (front side in FIG. 1) of the housing 2 is covered with a first cover 21. The second cover 22 and the bus bar cover 26 are attached to an outer side of the first cover 21. The rotor shaft 11 protrudes outward from the first cover 21 and rotatably supports the rotor shaft 11. The housing 2, the first cover 21, the second cover 22, and the bus bar cover 26 are formed by casting using a metal such as an aluminum alloy.

Slip rings 12 are provided on an outer periphery of the rotor shaft 11. Brushes 5 come into contact with the slip rings 12, and the inverter unit 3 and field winding provided on the rotor are electrically connected via the brushes 5, so that direct current electric power from the inverter unit 3 is supplied to the field winding.

The brushes 5 are held by a brush holder 15 in a state of being accommodated in the brush holder 15, and are fixed with respect to the rotor shaft 11.

Figure 3:
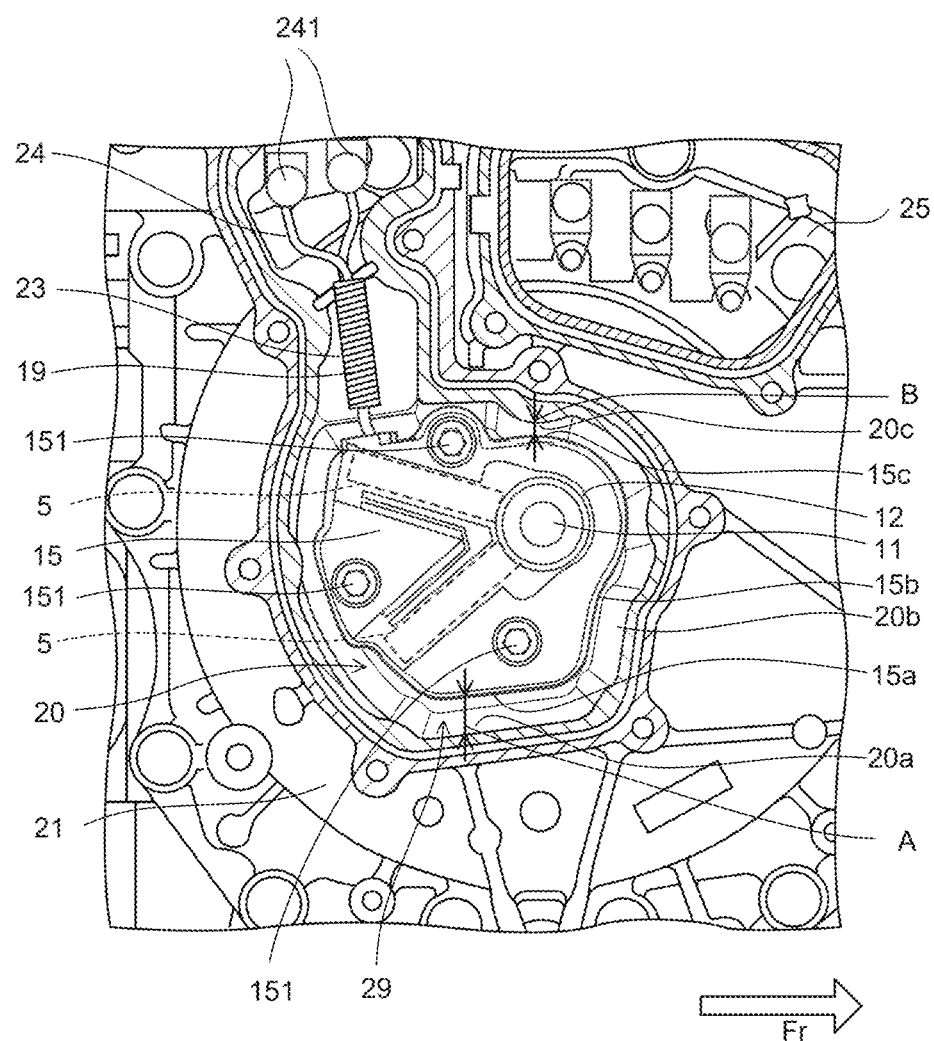
FIG. 3 is an explanatory diagram of a brush holder.

FIG. 3 is an explanatory diagram of the first cover 21 centering on a brush holder accommodating portion 20.

The first cover 21 includes the brush holder accommodating portion 20 in which the brush holder 15 is accommodated. The brush holder accommodating portion 20 is formed in a concave shape that is recessed from a side surface of the first cover 21 (outermost surface of the first cover 21) toward a back side in the axial direction. The brush holder accommodating portion 20 is formed in a shape that is one size larger than an outer peripheral shape of the brush holder 15.

The brush holder 15 is a case made of an insulating resin that accommodates and holds a plurality of brushes 5 therein. The brush holder 15 includes a through hole 16 through which the rotor shaft 11 passes.

The rotor shaft 11 is provided with the slip rings 12 as two electrodes, a positive electrode and a negative electrode, in parallel at positions separated from each other in the axial direction.

The brush holder 15 includes a pair of brushes 5 for each of the positive and negative slip rings 12. The brush 5 has a square rod shape, and one end side in a longitudinal direction thereof comes into contact with the slip ring 12 of the rotor shaft 11. A biasing member such as a spring is disposed on the other end side of the brush 5 in the longitudinal direction, and the brush 5 is pressed toward the slip ring 12.

The pair of brushes 5 fixed to the brush holder 15 come into contact with the positive or negative slip ring 12. An angle between axial center lines in longitudinal directions of the pair of brushes 5 is an acute angle. That is, the pair of brushes 5 are arranged in a V-shape so as to be separated from each other as being moved away from the slip ring 12. If the brush holder 15 is disposed biased to one side of the rotor shaft 11 as will be described later, the brushes 5 do not necessarily have to be arranged in a V-shape at an acute angle.

The brush holder 15 is fixed to a side surface of the brush holder accommodating portion 20 with three bolts 151.

In the first cover 21, the brush holder accommodating portion 20 communicates with a communication portion 23 that is formed shallowly in the axial direction at an upper portion thereof. The communication portion 23 further communicates with a connection portion 24 that is recessed in the axial direction at an upper portion thereof. Tip ends of field bus bars 241 to which the direct current electric power of the inverter unit 3 is supplied are accommodated in the connection portion 24. Wiring 19 is connected between the field bus bars 241 and the brush holder 15. The wiring 19 is routed in an up-down direction from the connection portion 24 to the brush holder accommodating portion 20 via the communication portion 23. Each end of the wiring 19 is connected to the brush 5.

As shown in FIG. 2, the second cover 22 is attached to the brush holder accommodating portion 20 recessed in the first cover 21, the communication portion 23, and the connection portion 24 to close these parts from the outside.

A bus bar accommodating portion 25 is recessed in the axial direction above the brush holder accommodating portion 20 and on a side of the connection portion 24. Tip ends of three-phase bus bars 41 for supplying three-phase electric power of the inverter unit 3 are accommodated in the bus bar accommodating portions 25. As shown in FIG. 2, the bus bar cover 26 is attached to the bus bar accommodating portion 25 to close a concave portion of the bus bar accommodating portion 25 from the outside.

In the rotating electric machine 1 configured as described above, measures against abrasion powder of the brush 5 will be described.

The brush 5 is in sliding contact with the slip ring 12, and the brush 5 and the slip ring 12 are gradually abraded as the rotor shaft 11 rotates. The abrasion powder is accumulated inside the brush holder 15, but the abrasion powder is discharged to the outside of the brush holder 15 because the brush holder 15 does not have a sealed structure. The abrasion powder contains a metal component and thus has conductivity, so that when the abrasion powder is accumulated on the outside of the brush holder 15, an insulation distance between the brush 5 in the brush holder 15 and the first cover 21 is shortened, which may affect an insulation property.

Further, the rotating electric machine 1 has a liquid cooling (oil cooling) structure, and thus does not include an air blowing mechanism such as a fan. Therefore, it is not possible to adopt a structure in which a gap is provided in the first cover 21 to discharge the abrasion powder to the outside by air blowing and to prevent rainwater from entering from the outside.

Therefore, in the present embodiment, the following configuration is used to prevent an influence on the insulation property due to the accumulated abrasion powder.

As shown in FIG. 3, the brush holder 15 is disposed in the brush holder accommodating portion 20 such that a distance (indicated by A in FIG. 3) between a lower surface 15a of the brush holder 15 and an inner peripheral wall 20a of the brush holder accommodating portion 20 facing the lower surface 15a is larger than a distance between another peripheral surface 15b of the brush holder 15 and an inner peripheral wall 20b of the brush holder accommodating portion 20 facing the other peripheral surface 15b.

The brush holder 15 is disposed such that a distance (indicated by B in FIG. 3) between an upper surface 15c of the brush holder 15 and an inner peripheral wall 20c of the brush holder accommodating portion 20 facing the upper surface 15c is smaller than the distance between the other peripheral surface 15b of the brush holder 15 and the inner peripheral wall 20b of the brush holder accommodating portion 20 facing the other peripheral surface 15b.

In the brush holder accommodating portion 20, by setting the distance between the lower surface 15a of the brush holder 15 and the inner peripheral wall 20a of the brush holder accommodating portion 20 to be large (for example, tens of millimeters), it is possible to form a sufficient space for accumulating the abrasion powder below the brush holder 15. That is, a space surrounded by the lower surface 15a of the brush holder 15, the first cover 21 (side surface of the brush holder accommodating portion 20), and the second cover 22 is configured as an abrasion powder accumulation portion 29.

As described above, in the present embodiment, since the abrasion powder accumulation portion 29 having a sufficient capacity is formed below the brush holder 15, even when the abrasion powder of the brush 5 falls downward and is accumulated in the abrasion powder accumulation portion 29, the insulation distance between the brush 5 in the brush holder 15 and the first cover 21 is sufficiently maintained. Accordingly, an influence on an insulation property between the brush 5 and the first cover 21 can be prevented.

Next, a configuration of the brush holder accommodating portion 20 when the drive unit 100 is mounted on a vehicle will be described.

Figure 4:
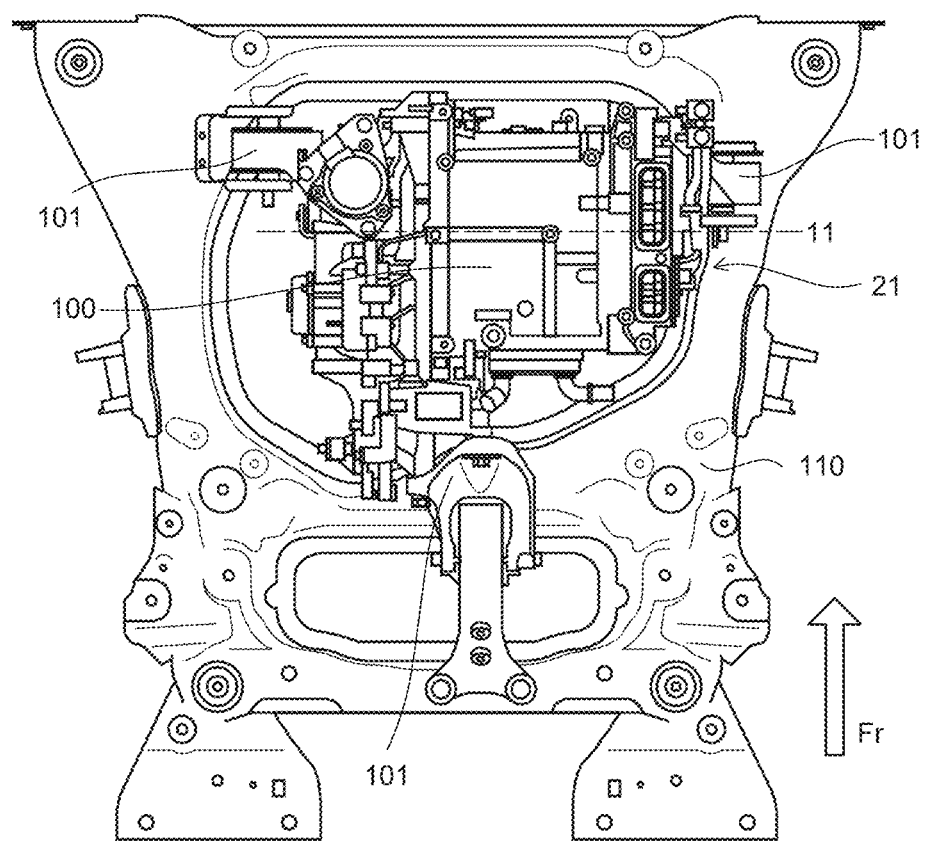
FIG. 4 is an explanatory diagram showing a state where the rotating electric machine is mounted on a vehicle.

FIG. 4 is an explanatory diagram showing a case where the drive unit 100 of the present embodiment is mounted on the vehicle.

In FIG. 4, three mount brackets 101 are fixed to the drive unit 100, and the drive unit 100 is supported by a suspension member 110 via the mount brackets 101. The mount brackets 101 are provided at two locations on a front side in a vehicle front-rear direction of the drive unit 100 and at both ends in a vehicle width direction, and at one location on a rear side in the vehicle front-rear direction of the drive unit 100 and at a center in the vehicle width direction.

With such a configuration, the drive unit 100 is disposed such that the center of gravity thereof is located approximately at a center of a triangle connecting the positions of the three mount brackets 101. The suspension member 110 supporting the drive unit 100 is fixed to a vehicle body.

As shown in FIG. 1, the brushes 5 are arranged in a V-shape on one side (left side in the drawing, vehicle rear side) of the rotor shaft 11 in the brush holder 15. Therefore, the brush holder accommodating portion 20 is disposed at a position biased to the vehicle rear side (one side) with respect to the rotor shaft 11.

On the other hand, among the mount brackets 101 to which the drive unit 100 is fixed, the mount bracket 101 fixed to a right side surface (first cover 21 side) of the drive unit 100 is disposed on a vehicle front side (one side) with respect to the rotor shaft 11.

With such a configuration, while the mount bracket 101 is disposed at a most suitable position in the drive unit 100, the mount bracket 101 does not interfere when the second cover 22 is opened or closed and when the brush holder 15 is attached or detached during maintenance or replacement of the brush holder 15.

The bus bar accommodating portion 25 is disposed above the other side of the brush holder accommodating portion 20, that is, above the vehicle front side with respect to the rotor shaft 11. By disposing the brush holder accommodating portion 20 at the position biased to the vehicle rear side with respect to the rotor shaft 11, a sufficient space is generated to dispose the three-phase bus bar 41 above the vehicle front side.

By disposing the three-phase bus bar 41 above the rotor shaft 11, the inverter unit 3 can be disposed above the rotating electric machine 1 and integrally with the rotating electric machine 1. Since the rotating electric machine 1 includes the stator and the rotor in the housing 2 having high rigidity, the inverter unit 3 is protected by the rotating electric machine 1 having high rigidity and a case is prevented from being broken even at the time of a collision, for example.

As described above, the present embodiment is applied to the rotating electric machine 1 including the brush holder 15 that holds the brushes 5. The rotating electric machine 1 includes the housing 2 including the first cover 21 through which the rotor shaft 11 passes. The brush holder accommodating portion 20 that accommodates the brush holder 15 is recessed in the first cover 21 in the axial direction from the outer side of the first cover 21. The brush holder 15 is disposed in the brush holder accommodating portion 20 such that the distance (A) between the lower surface 15*a* of the brush holder 15 and the inner peripheral wall 20*a* of the brush holder accommodating portion 20 facing the lower surface 15*a* is larger than the distance between the other peripheral surface 15*b* of the brush holder 15 and the other inner peripheral wall 20*b* of the brush holder accommodating portion 20 facing the other peripheral surface 15*b*.

With such a configuration, the abrasion powder accumulation portion 29 having a sufficient capacity to accumulate the abrasion powder can be provided below the brush holder 15. The abrasion powder of the brush 5 is accumulated in the abrasion powder accumulation portion 29. Accordingly, even when the abrasion powder of the brush is accumulated in the abrasion powder accumulation portion 29, the insulation distance between the brush 5 and the housing 2 (and the first cover 21) can be maintained. In this way, it is possible to prevent the deterioration in the insulation property between the brush 5 and the housing 2.

In the present embodiment, the space surrounded by the lower surface 15*a* of the brush holder 15, the inner peripheral wall 20*a* of the brush holder accommodating portion 20, the first cover 21, and the second cover 22 is configured as the abrasion powder accumulation portion 29 in which the abrasion powder of the brushes 5 is accumulated.

With such a configuration, even when the brush holder accommodating portion 20 that accommodates the brush holder 15 has a sealed structure, a space capable of sufficiently accumulating the abrasion powder of the brush 5 can be provided.

In the present embodiment, the brush holder 15 holds the brushes 5 such that the brushes 5 come into contact with the rotor shaft 11 from one side of the rotor shaft 11.

With such a configuration, the brush 5 comes into contact with the slip ring 12 of the rotor shaft 11 from the vehicle rear side (one side), so that the brush holder 15 can be disposed at a position biased to the vehicle rear side with respect to the rotor shaft 11. Accordingly, an area occupied by the brush holder 15 in the first cover 21 can be minimized.

In the present embodiment, the rotor shaft 11 is provided with a plurality of electrodes (slip rings 12) at positions separated from each other in the axial direction, and the brush holder 15 holds the brushes 5 such that one pair of brushes 5 comes into contact with one electrode (positive electrode) and another pair of brushes 5 comes into contact with another one electrode (negative electrode).

With such a configuration, even when the rotor shaft 11 is provided with the plurality of electrodes (slip rings 12) as the positive electrode and the negative electrode, the brush holder 15 can be disposed at the position biased to the vehicle rear side with respect to the rotor shaft 11 by bringing the pair of brushes 5 into contact with the each of the slip rings 12 from the vehicle rear side (one side) in a V-shape.

In the present embodiment, the bus bar accommodating portion 25 that accommodates the three-phase bus bar 41 electrically connected to the rotating electric machine 1 is recessed in the first cover 21 in the axial direction. In the first cover 21, the brush holder accommodating portion 20 is disposed at a position biased to the vehicle rear side with respect to the rotor shaft 11, and the bus bar accommodating portion 25 is disposed above the brush holder accommodating portion 20.

With such a configuration, by disposing the brush holder 15 at the position biased to the one side of the rotor shaft 11, it is possible to secure a sufficient space for disposing, on an upper portion of the rotor shaft 11, the bus bar accommodating portion 25 that accommodates the three-phase bus bar 41. Accordingly, the inverter unit 3 and the rotating electric machine 1 can be disposed close to each other, and thus the inverter unit 3 is protected by the rotating electric machine 1 having high rigidity and a case is prevented from being broken even at the time of a collision, for example.

In the present embodiment, the rotating electric machine 1 is supported by the vehicle body via the suspension member 110, the mount bracket 101 configured to connect the rotating electric machine 1 and the suspension member 110 is provided on the outer side of the first cover 21, and the mount bracket 101 is disposed at a position biased to the vehicle front side with respect to the rotor shaft 11 and the brush holder accommodating portion 20.

With such a configuration, since the brush holder accommodating portion 20 is disposed at the position biased to the vehicle rear side with respect to the rotor shaft 11, the mount bracket 101 fixed to the side surface of the drive unit 100 can be disposed at the vehicle front side with respect to the rotor shaft 11, which is an optimum position with respect to the drive unit 100. Accordingly, the mount bracket 101 supporting the rotating electric machine 1 can be disposed at an appropriate position while not interfering with opening and closing of the second cover 22 covering the brush holder accommodating portion 20.

In the present embodiment, the brush holder 15 is disposed in the brush holder accommodating portion 20 such that the distance between the upper surface 15c of the brush holder 15 and the inner peripheral wall 20c of the brush holder accommodating portion 20 facing the upper surface 15c is smaller than the distance between the other peripheral surface 15b of the brush holder 15 and the other inner peripheral wall 20b of the brush holder accommodating portion 20 facing the other peripheral surface 15b.

With such a configuration, by disposing the brush holder 15 as close to an upper side as possible in the brush holder accommodating portion 20, the distance between the lower surface 15a of the brush holder 15 and the inner peripheral wall 20a of the brush holder accommodating portion 20 can be increased.

Although the embodiment and modifications of the present invention have been described above, the above embodiment and modifications are merely a part of application examples of the present invention, and do not mean that the technical scope of the present invention is limited to the specific configurations of the above embodiment.

The present invention shows a winding field type electric motor as the rotating electric machine 1, but is not limited thereto, and can be applied to a rotating electric machine having a brush (DC motor, induction motor, or the like).

The invention claimed is:

1. A rotating electric machine, comprising:
a brush holder that holds brushes; and
a housing including a first cover through which a rotor shaft passes, wherein
a brush holder accommodating portion that accommodates the brush holder is recessed in the first cover in an axial direction from an outer side of the first cover, and
the brush holder is disposed in the brush holder accommodating portion such that a distance between a lower surface of the brush holder and an inner peripheral wall of the brush holder accommodating portion facing the lower surface is larger than a distance between as other peripheral surface of the brush holder and an inner peripheral wall of the brush holder accommodating portion facing the other peripheral surface.

2. The rotating electric machine according to claim 1, further comprising:
a second cover that covers the brush holder accommodating portion, wherein
a space surrounded by the lower surface of the brush holder, the inner peripheral wall of the brush holder accommodating portion, the first cover, and the second cover is configured as an abrasion powder accumulation portion in which abrasion powder of the brushes is accumulated.

3. The rotating electric machine according to claim 1, wherein
the brush holder holds the brushes such that the brushes come into contact with the rotor shaft from one side of the rotor shaft orthogonal to the axial direction.

4. The rotating electric machine according to claim 3, wherein
the rotor shaft is provided with a plurality of electrodes at positions separated from each other in the axial direction, and
the brush holder holds the brushes such that one pair of the brushes comes into contact with one of the electrodes and another pair of the brushes comes into contact with another one of the electrodes.

5. The rotating electric machine according to claim 3, wherein
a bus bar accommodating portion that accommodates a tip end of a three-phase bus bar electrically connected to the rotating electric machine is recessed in the first cover in the axial direction from the outer side of the first cover, and
in the first cover, the bus bar accommodating portion is disposed above the brush holder accommodating portion.

6. The rotating electric machine according to claim 3, wherein
the rotating electric machine is to be supported by a vehicle body via a suspension member,
a mount bracket configured to connect the rotating electric machine and the suspension member is provided on the outer side of the first cover, and
the mount bracket is disposed at a position biased to a vehicle front side with respect to the brush holder accommodating portion in a vehicle front-rear direction.

7. The rotating electric machine according to claim 1, wherein
the brush holder is disposed in the brush holder accommodating portion such that a distance between an upper surface of the brush holder and an inner peripheral wall of the brush holder accommodating portion facing the upper surface is smaller than the distance between the other peripheral surface of the brush holder and the inner peripheral wall of the brush holder accommodating portion facing the other peripheral surface.

* * * * *